May 30, 1933.  F. H. SMITH ET AL  1,911,775
METHOD OF MAKING PIPE COUPLINGS
Filed Jan. 17, 1929
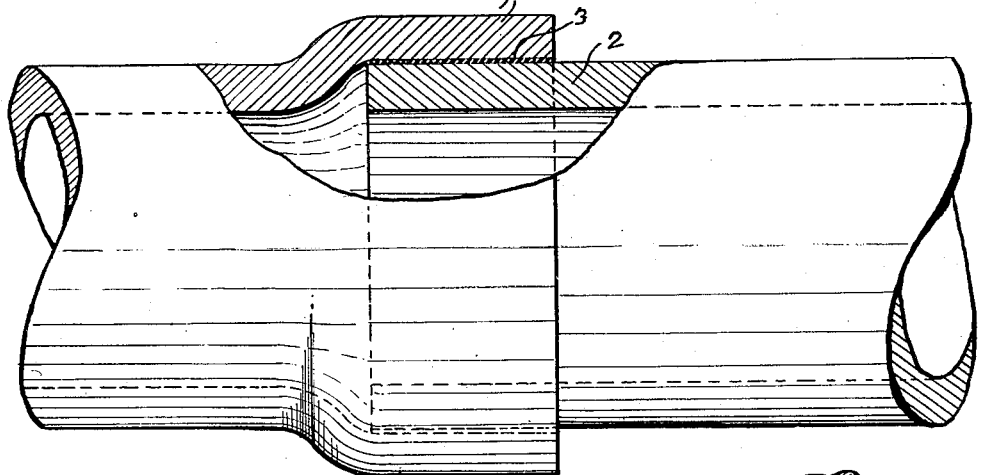
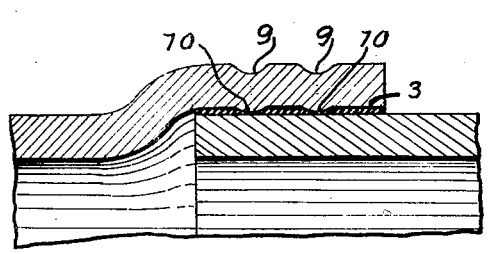
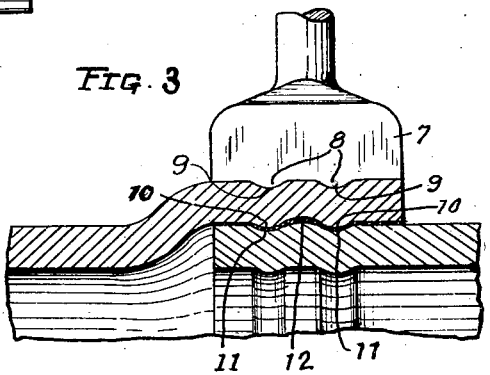
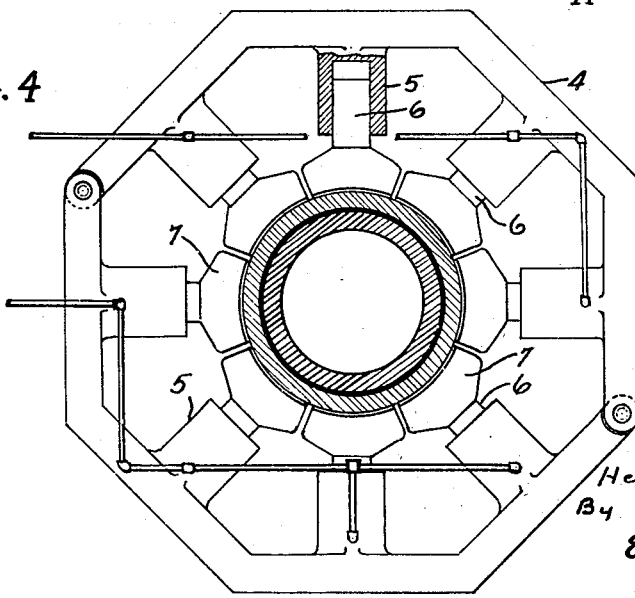
INVENTORS
Frank H. Smith
Henry H. Stringfellow
By
Evans & McCoy
ATTORNEYS Patented May 30, 1933

1,911,775

UNITED STATES PATENT OFFICE

FRANK H. SMITH, OF PHILADELPHIA, PENNSYLVANIA, AND HENRY A. STRINGFELLOW, OF AKRON, OHIO

METHOD OF MAKING PIPE COUPLINGS

Application filed January 17, 1929. Serial No. 333,135.

This invention relates to pipe joints and the method of making the same and has for its object to provide an economical method of making permanent fluid tight connections which may be advantageously employed in laying pipes in the field as well as for joining lengths of pipe in the shop.

A further object is to provide a joint which possesses great strength and which is perfectly fluid tight.

A further object is to provide a joint in which the pipe ends are telescopically connected and in which the joint is sealed by packing material which is confined under great pressure between the interior of the outer pipe and the exterior of the inner pipe.

With the above and other objects in view, the invention may be said to comprise the method and joint as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification in which:

Figure 1 is a fragmentary view partially in section showing the pipe ends telescopically fitted together prior to the shrinking operation by which the pipes are permanently connected.

Fig. 2 is a fragmentary sectional view showing the joint at an intermediate stage of the shrinking operation.

Fig. 3 is a fragmentary sectional view showing the completed joint.

Fig. 4 is a view showing apparatus for applying radial pressure to the joint to shrink the outer pipe on the inner.

Pipes to be connected by telescopic joints are ordinarily manufactured with one end of each pipe enlarged to an internal diameter slightly greater than the external diameter of the outlet and of the pipe so that the small end of one pipe may be readily inserted into the large end of an adjacent pipe. As herein illustrated, one of the pipes is provided with a bell 1 and the adjacent pipe with a spigot 2 which is of a size to readily enter the bell 1, as shown in Fig. 1 of the drawing, the end of the spigot 2 is covered with a thin layer 3 of packing material and the bell 1 is made sufficiently large to permit the spigot 2 with its covering of packing material 3 thereon to be readily inserted into the bell.

The method of the present invention contemplates the formation of a permanent joint by applying radial pressure to the telescopic pipe ends causing the metal of one or both of the pipes to be stressed beyond its elastic limit to permanently change the diameter of one pipe end and set up internal stresses in the other pipe which causes the latter pipe to exert a heavy radial pressure upon the contiguous surface of the other pipe throughout its circumference so that the pipes are permanently and rigidly held together.

The method of the present invention also contemplates a further deformation of the pipes in the form of longitudinally spaced circumferential ribs and grooves formed by applying the radial pressure along spaced circumferential lines so as to force out ribs from the surface of one of the pipes and to force said ribs into the metal of the other pipe to form grooves in the contiguous surface thereof in which the ribs fit. This operation causes a portion of the packing material to be pinched off from the remainder of the packing material and confined in the space between the circumferential ribs, the space in which the packing between the ribs is confined being gradually contracted as the pressure is continued so that the packing confined between the protruding ribs is caulked under an enormous pressure which is maintained after the external pressure has been removed.

As illustrated in Fig. 4, the pressure may be applied by means of hydraulically operated pressure applying elements carried by a sectional ring 4, the ring 4 being provided upon the interior thereof with circumferentially spaced hydraulic cylinders 5, each of which has a plunger 6 provided with a head 7 which is laterally elongated and provided with an arcuate inner face for engagement with the external surface of the bell 1. Each of the heads 7 is provided with a pair of spaced longitudinal ribs 8 and the heads 7 are so formed as to engage the bell 1 substantially throughout its periphery. The ribs 8 of the head 7 are circumferentially alined so that when the heads 7 are simultaneously forced inwardly by hydraulic pressure, spaced circumferential grooves 9 are pressed into the exterior surface of the bell 1 and spaced ribs 10 are formed on the inner surface of the bell. The radial pressure applied to the bell stresses the metal of the bell beyond its elastic limit and permanently reduces the diameter of the bell, pressing the inner surface thereof against the external surface of the spigot 2.

As illustrated in Fig. 2 of the drawing, the pressure on the bell 1 first presses in the grooves 9 and forces the metal of the bell inwardly to form ribs 10 which are first driven into tight engagement with the spigot 2. The pressure of the ribs 9 on the packing material which is preferably formed of relatively soft metal such as lead or other metal softer than the metal of the pipes pinches the packing along circumferential lines tending to sever the packing along these lines and force a portion thereof to flow inwardly between the ribs and the remainder to flow outwardly from the ribs. As the pressure is continued, the bell is gradually reduced in diameter and the ribs 9 are forced into the metal of the spigot 2 forming grooves 11 in the exterior surface of the spigot in which the ribs 10 fit. The continued inward movement of the ribs 10 pressing into the spigot 2 tends to reduce the space between the ribs in which a portion of the packing is confined so that this portion of the packing is caulked under an enormous pressure. The bell is thus permanently shrunk on the spigot 2 and stresses are set up in the spigot 2 which maintain a radial outward pressure on the bell which may be nearly equal to the elastic limit of the steel. The packing between the ribs 10 is thus not only caulked under enormous pressure, but is permanently subjected to a very great pressure due to the internal stresses set up in the spigot by the mechanical shrinking operation.

It will be apparent that the method of the present invention produces a joint in which the pipes are rigidly interlocked against relative endwise movement, in which the pipes are rigidly held against relative pivotal movements and in which a fluid tight seal is maintained by a packing which is confined in the joint and permanently subjected to a very heavy radial pressure. A relatively soft metal subjected in a confined space to heavy pressure acts as a liquid flowing into all crevices of the space in which it is confined.

The portion 12 of the packing confined between the ribs 10 is therefore caused to completely fill the space between the ribs and between the outer surface of the spigot and the inner surface of the bell so that a perfectly fluid tight joint is obtained.

Any suitable means may be employed for simultaneously supplying liquid under pressure to the cylinders 5 and the shrinking operation can be quickly and easily performed.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. The herein described method of joining pipes which consists in inserting the end of one pipe into the end of another with packing material between the external surface of the inner pipe and the internal surface of the outer pipe, and pressing the wall of one pipe against the wall of the other by applying radial pressure to one of the pipes along spaced circumferential lines and stressing the metal of both pipes beyond the elastic limit thereof along said lines to form interfitting circumferential ribs and grooves in said pipes and to confine and compress a portion of the packing material intermediate the spaced circumferential ribs.

2. The herein described method of joining pipes which consists in inserting the end of one pipe into the end of another with packing material between the external surface of the inner pipe and the internal surface of the outer pipe, and shrinking the outer pipe upon the inner by applying radial pressure thereto along spaced circumferential lines, permanently reducing the diameter of the outer pipe and stressing the metal of both pipes beyond the elastic limit thereof along said lines to form interfitting circumferential ribs and grooves in the pipes and to confine and compress a portion of the packing material intermediate the spaced circumferential ribs.

3. The herein described method of joining pipes which consists in inserting the end of one pipe into the end of another with packing material between the external surface of the inner pipe and the internal surface of the outer pipe, and shrinking the outer pipe upon the inner by applying radial pressure thereto simultaneously throughout the circumference thereof along spaced circumferential lines, permanently reducing the diameter of the outer pipe and stressing the metal of both pipes beyond the elastic limit thereof along said lines to form interfitting circumferential ribs and grooves in the pipes and to confine and compress a portion of the packing material intermediate the spaced circumferential ribs.

In testimony whereof we affix our signatures.

FRANK H. SMITH.
HENRY A. STRINGFELLOW.